3,240,766
FILM COMPOSITIONS COMPRISING A TERPOLYMER OF ETHYLENE, ONE OTHER ALPHA-OLEFIN AND A VINYL ESTER
John E. Thomson and Hardy E. Ross, Lake Jackson, Tex., assignors to The Dow Chemical Company, Midland, Mich., a corporation of Delaware
No Drawing. Filed Mar. 14, 1962, Ser. No. 179,768
12 Claims. (Cl. 260—80.5)

This invention relates to terpolymers of ethylene. More particularly, it relates to terpolymers of ethylene, which by conventional extrusion techniques, produce clear, thin films.

Polymers of ethylene are known from which clear films with low haze can be produced. Other polymers are known from which films with high impact strength can be obtained. Still other polymers are available from which films with high gloss may be prepared. There is a need, however, for a polymer which combines the advantageous properties hereindescribed.

It is an object of this invention to provide new polymers of ethylene having improved properties. A particular object is to provide such polymers which, by conventional extrusion techniques, produce clear, thin films possessing superior optical clarity, high gloss, low haze, and high impact strength. Another object is to provide new terpolymers of ethylene having such improved properties. Other objects and advantages will be apparent from the following description of the invention.

It has been discovered that when, under high pressure, ethylene is copolymerized with an alpha unsaturated olefin and a monoethylenically unsaturated carboxylic ester, a terpolymer product is obtained which, when extruded by conventional means, produces thin, clear films with superior optical clarity, high gloss, low haze, and high impact strength.

More particularly, the products of this invention are terpolymers of from about 0.1 to about 10, preferably from about 0.2 to about 2, percent by weight of an alpha unsaturated olefin having from 3 to 18 carbon atoms, preferably propylene, from about 1 to about 45, preferably from about 2 to about 30, percent by weight of a vinyl ester of a lower alkanoic monobasic acid, preferably vinyl acetate, and from about 45 to about 98.9, preferably about 68 to about 97.8, percent by weight, i.e., the balance of the terpolymer, of ethylene, and compositions thereof, and articles, particularly thin films, fabricated therefrom.

Among the alpha unsaturated olefins which may be used are propylene, 1-butene, isobutene, 1-pentene, 1-hexene, 1-octene, 3-methyl-1-butene, 4-methyl-1-pentene, 3-methyl-1-pentene, 1-octadecene and the like; propylene is preferred.

Suitable vinyl esters of lower alkanoic monobasic acids for the purposes of this invention are vinyl formate, vinyl acetate, vinyl propionate, vinyl n-butyrate, and vinyl isobutyrate; vinyl acetate is preferred.

The terpolymers of this invention are prepared by polymerizing mixtures of the corresponding monomers using polymerization-grade monomers and apparatus, procedures, and conditions in accordance with the known art for high-pressure polymerization of ethylene. The polymerization may be carried out either in tubular or autoclave reactors at pressures from 15,000 to 35,000 pounds per square inch, or higher, and at temperatures from 300° F. to 550° F. using, at conventional concentration, the commercially available polymerization catalysts such as (a) peroxygen-type catalysts or (b) oxygen, or mixtures of (a) and (b) as well as other free radical producing materials such as the azo catalysts and others well known in the art. Examples of the peroxygen-type catalysts are diethyl peroxide, hydrogen peroxide, persuccinic acid, lauroyl peroxide, tetrahydronaphthalene peroxide, alkali metal and alkaline earth metal and ammonium persulfates, perborates, percarbonates and the like. Such catalysts are used in the range of 5 to 2000 p.p.m. (calculated as oxygen).

As is known, the upper limit of pressure is determined by the mechanical strength of the reactor and the pumps. The same relationships, as in the prior art for polymerization of ethylene, that higher pressure effects higher molecular weights and higher conversions, apply to the practice of this invention. Preferably the polymerization is carried out in the absence of water or inert solvents but water and inert solvent may be added if desired.

EXAMPLE 1

High purity ethylene containing 2 mole percent propylene and 1.5 mole percent vinyl acetate are pumped into a stirred autoclave at a pressure of 22,000 pounds per square inch at the reaction temperature of 400° F., where polymerization is initiated by about 100 p.p.m. lauroyl peroxide catalyst during a contact time of 45 seconds. The unreacted monomers are recovered and recycled while the terpolymer is pelletized through an extruder. The product has the following properties (determined by standard methods hereinafter identified):

| | |
|---|---|
| Melt index | 1.3 |
| Specific gravity | .934 |
| Stiffness | $1.0 \times 10^4$ |
| Vinyl acetate, weight percent | 9.2 |
| Propylene, weight percent | 0.8 |
| Ethylene, weight percent by difference | 90.0 |

EXAMPLES 2, 3 AND 4

Examples 2, 3 and 4 and corresponding Samples 2 through 4, respectively, designate polymers which were prepared from mixtures of ethylene, propylene, and vinyl acetate by substantially the same procedure as shown in Example 1. The composition and properties of the resulting terpolymers are shown in Table I. For purposes of contrast with the terpolymers of this invention, a binary copolymer of ethylene and propylene (Sample 5) and a binary copolymer of ethylene and vinyl acetate (Sample 6) were prepared. The composition and properties of these binary copolymers are also shown in Table I.

The polymers of Samples 2 through 6 were fabricated into thin films having thickness of approximately 1.5 mils by extrusion through a 1.5 inch tubing extruder and blowing under substantially identical conditions in conventional blown film technique. Properties of the resulting film products were then determined and are shown in Table I.

The following methods were used to evaluate the properties of the polymer products and the films obtained therefrom.

*Melt index.*—The melt index was determined by the method of ASTM D1238–52T.

*Specific gravity.*—The specific gravity was determined by the method of ASTM D792–50, modified for liquid temperature of 25±0.2° C. rather than 23±0.1° C.

*Stiffness.*—The stiffness was measured by the method of ASTM D747–58T.

*Percent propylene.*—The percent propylene in the terpolymer was determined on the basis of a material balance calculation.

*Percent vinyl acetate.*—At concentrations below about 5 weigth percent vinyl acetate based on the total polymer weight, a film of about 0.1 mm. thickness was examined at the 1250 cm.$^{-1}$ band where the acetate group frequency occurs. When the vinyl acetate was present at proportions greater than about 5 weight percent, a film of 0.5 to 1.0 mm. thickness was examined at 3450 cm.$^{-1}$ where a strong carbonyl overtone is present.

*Clarity.*—The clarity test was carried out and the clarity value was determined as follows: A narrow beam of light passing through slits passes through the film sample and the intensity of the transmitted light is measured by the voltage generated in a photocell. The photocell is driven across the transmitted beam from minimum intensity, through maximum intensity, and thence out again to minimum intensity. The photocell voltage is recorded on a standard recorder as one ordinate against cell travel as the other ordinate, thereby tracing a bell-shaped curve on the recorder chart. The apparatus is adjusted and calibrated so that, when no film is in the film holder (air transmission), the bell curve is nine inches high, i.e., the peak (maximum intensity) is nine inches above the base line (minimum intensity), and the width of the bell is approximately 1.3 inches when measured parallel to and 0.5 inch up from the base line. When the apparatus is so standardized, the operations are carried out with a test sample film in place in the film holder and the transmission curve is drawn for the film sample whose clarity is to be measured. From the resulting bell curve, the height (H) in inches of the peak (maximum intensity) of the bell above the base line is measured. The value of H is taken as a measure of film clarity. The highest clarity will have the highest H value since the transmitted light beam will be intense at maximum and sharp at the edges. Lack of clarity will be evident as a lower value of H.

*Gloss.*—The gloss was determined by the method of ASTM D523–53T.

*Haze.*—The haze was measured according to ASTM D1003–52 Method A.

*Impact.*—The impact strength was measured in a manner similar to ASTM D1709–59T. A modified dart having a length of 6.5 inches rather than 4.5 inches and a weight of 55 grams rather than 32 grams was dropped from 26.5 inches rather than 26 inches. Incremental weights of 20 grams were used. Calculations were made by the alternate graphic method, as described in ASTM D1709–59T.

*Table I*

| Example No. | 2 | 3 | 4 | 5 | 6 |
|---|---|---|---|---|---|
| Sample No. | 2 | 3 | 4 | 5 | 6 |
| Melt Index | 2.8 | 2.2 | 6.1 | 2.2 | 2.0 |
| Specific gravity | .925 | .927 | .936 | .923 | .920 |
| Stiffness (×10$^{-4}$), p.s.i. | 1.6 | 1.0 | 0.5 | 2.1 | 1.3 |
| Propylene in polymer, percent | 1.5 | 0.5 | 0.2 | 2.8 | 0 |
| Vinyl Acetate in Polymer, percent | 5.8 | 13.6 | 25.5 | 0 | 5.9 |
| Film: 1.5 Mil Thickness— | | | | | |
| Clarity | 6.6 | 6.0 | 7.4 | 6.1 | 2.2 |
| Gloss | 94 | (a) | 100+ | 72 | 17 |
| Haze, percent | 3.5 | (a) | 1.6 | 5.0 | 13 |
| Impact g | 140 | 340+ | 200+ | 85 | 200+ | a Not Determined.

From these and other data, it is found that advantageous results in thin films having superior optical clarity, high gloss, low haze, and high impact strength are obtained in terpolymers of from 0.1 to 10, preferably from 0.2 to 2, percent by weight of propylene, from 1 to 45, preferably from 2 to 30, percent by weight vinyl acetate, and from 45 to 98.9, preferably from 68 to 97.8, percent by weight, i.e. the remainder, of ethylene.

It will be seen from Table I, contrasting Samples 2 through 4 with Samples 5 and 6, that the terpolymers of this invention have better gloss and lower haze than either of the binary copolymers. The clarity of the terpolymers is better than that of the ethylene-vinyl acetate binary copolymer and at least as good as that of the ethylene-propylene copolymer. The impact strength of the terpolymers of this invention is higher than that of the ethylene-propylene copolymer and in some instances is even higher than that of the ethylene-vinyl acetate copolymer.

It will also be seen from the foregoing examples that different combinations of optical properties and impact strengths can be obtained by varying the proportions of the constituent monomers within the scope of the terpolymers of this invention.

While vinyl acetate is preferred, there may be substituted therefor in the foregoing examples other ethylenically unsaturated carboxylic esters, such as vinyl formate, vinyl propionate, vinyl n-butyrate, vinyl isobutyrate and the like, with substantially the same results.

In the practice of this invention, those alpha-unsaturated olefins having no branching on the No. 2 carbon atom, especially propylene, are preferred. However, alpha-unsaturated olefins such as 1-butene, isobutene, 1-pentene, 1-hexene, 1-octene, 3-methyl-1-butene, 4-methyl-1-pentene, 3-methyl-1-pentene, 1-octadecene and the like, may be used.

The terpolymers of this invention can be compounded with conventional additives and modifiers useful in the resin plastics art, such as antioxidants and stabilizers, antistatic agents, anti-blocking agents, slip agents, colorants, and the like.

The products which are made available by this invention find particular usefulness in the several known markets to which clear films, with good optical clarity, high gloss, low haze, and high impact strength are applicable. For instance, the film from Example 2 exhibits excellent optical and impact properties and at the same time possesses sufficient stiffness for use in automatic wrapping and bag filling operations.

Although particularly useful and advantageous in the form of thin films, the terpolymers of this invention are also useful in articles fabricated by molding, extrusion, and other methods.

What is claimed is:

1. A composition of matter comprising a random terpolymer of (a) about 53 to about 98.9 percent by weight of ethylene, (b) about 0.1 to about 2 percent by weight of an alpha-unsaturated olefin having from 3 to 18 carbon atoms, and (c) about 1 to about 45 percent by weight of a vinyl ester of a lower alkanoic monobasic acid, all percentages based on the total weight of the terpolymer.

2. The composition of claim 1, wherein said alpha-unsaturated olefin (b) is propylene.

3. A composition of matter comprising a random terpolymer of (a) about 53 to about 98.9 percent by weight of ethylene, (b) about 0.1 to about 2 percent by weight of propylene, and (c) about 1 to about 45 percent by weight of vinyl acetate, all percentages based on the total weight of the terpolymer.

4. The composition of claim 3 in which the propylene constituent of the terpolymer is in the range of about 0.2 to about 2 percent, based on the total weight of the terpolymer.

5. The composition of claim 3 in which the vinyl acetate constituent of the terpolymer is in the range of about 2 to about 30 percent by weight, based on the total weight of the terpolymer.

6. A composition of matter comprising a random terpolymer of (a) about 68 to about 97.8 percent by weight of ethylene, (b) about 0.2 to about 2 percent by weight of propylene, and (c) about 2 to about 30 percent by weight of vinyl acetate, all percentages based on the total weight of the terpolymer.

7. An extruded film comprising a random terpolymer of (a) about 53 to about 98.9 percent by weight of ethylene, (b) about 0.1 to about 2 percent by weight of an alpha-unsaturated olefin having from 3 to 18 carbon atoms, and (c) about 1 to about 45 percent by weight of a vinyl ester of a lower alkanoic monobasic acid, all percentages based on the total weight of the terpolymer.

8. The extruded film of claim 7 in which the said alpha-unsaturated olefin (b) is propylene.

9. An extruded film comprising a random terpolymer of (a) about 53 to about 98.9 percent by weight of ethylene, (b) about 0.1 to about 2 percent by weight of propylene, and (c) about 1 to about 45 percent by weight of vinyl acetate, all percentages based on the total weight of the terpolymer.

10. The extruded film of claim 9 in which the propylene constituent of the terpolymer is in the range of about 0.2 to about 2 percent, based on the total weight of the terpolymer.

11. The extruded film of claim 9 in which the vinyl acetate constituent of the terpolymer is in the range of about 2 to about 30 percent by weight, based on the total weight of the terpolymer.

12. An extruded film comprising a random terpolymer of (a) about 68 to about 97.8 percent by weight of ethylene, (b) about 0.2 to about 2 percent by weight of propylene, and (c) about 2 to about 30 percent by weight of vinyl acetate, all percentages based on the total weight of the terpolymer.

References Cited by the Examiner

UNITED STATES PATENTS

| | | | |
|---|---|---|---|
| 2,703,794 | 3/1955 | Roedel | 260—87.3 |
| 2,868,772 | 1/1959 | Ray et al. | 260—94.9 |
| 3,153,029 | 10/1964 | Fabar et al. | 260—878 |

FOREIGN PATENTS

| | | |
|---|---|---|
| 859,743 | 1/1961 | Great Britain. |

JOSEPH L. SCHOFER, *Primary Examiner.*

JOSEPH R. LIBERMAN, *Examiner.*